(12) United States Patent
Sato et al.

(10) Patent No.: US 7,115,289 B2
(45) Date of Patent: Oct. 3, 2006

(54) METHOD OF MANUFACTURING FERMENTED MALT BEVERAGES

(75) Inventors: Kazuo Sato, Higashihiroshima (JP); Akihiro Mizuno, Higashihiroshima (JP); Nobuhiko Mukai, Higashihiroshima (JP); Hitoshi Amano, Kakamigahara (JP)

(73) Assignees: Amano Enzyme Inc., Nagoya (JP); National Research Institue of Brewing, Hiroshima (JP)

( * ) Notice: Subject to any disclaimer, the term of this patent is extended or adjusted under 35 U.S.C. 154(b) by 301 days.

(21) Appl. No.: 10/612,407

(22) Filed: Jul. 3, 2003

(65) Prior Publication Data

US 2004/0101591 A1  May 27, 2004

Related U.S. Application Data

(63) Continuation of application No. PCT/JP01/11671, filed on Dec. 28, 2001.

(30) Foreign Application Priority Data

Jan. 5, 2001 (JP) .............................. 2001-000291
Mar. 5, 2001 (JP) .............................. 2001-059573

(51) Int. Cl.
*C12C 7/00* (2006.01)
*C12C 7/04* (2006.01)

(52) U.S. Cl. .............................. 426/11; 426/10; 426/12; 426/16; 426/29

(58) Field of Classification Search .................. 426/29, 426/11, 12, 10, 16
See application file for complete search history.

(56) References Cited

U.S. PATENT DOCUMENTS

| 3,379,534 A | 4/1968 | Gablinger |
| 4,318,927 A | 3/1982 | Marshall ...................... 426/11 |
| 4,355,047 A | 10/1982 | Line et al. ..................... 426/13 |
| 4,430,348 A | 2/1984 | Duncombe et al. ........... 426/13 |
| 4,684,525 A | 8/1987 | Plainer et al. ................. 426/16 |
| 4,837,034 A * | 6/1989 | Owades et al. ............... 426/16 |
| 4,929,452 A * | 5/1990 | Hamdy ......................... 426/11 |
| 5,346,706 A * | 9/1994 | Murray et al. ................. 426/11 |
| 6,265,000 B1 * | 7/2001 | Shimamura et al. .......... 426/16 |

FOREIGN PATENT DOCUMENTS

| EP | 0 523 333 A1 | 1/1993 |
| GB | 1 174 618 | 12/1969 |
| GB | 2 247 238 A | 2/1992 |
| JP | 56-058448 | 5/1981 |
| JP | 5-068529 | 3/1993 |
| JP | 7-051045 | 2/1995 |
| JP | 7-327659 | 12/1995 |
| JP | 8-009955 | 1/1996 |
| JP | 8-070842 | 3/1996 |
| JP | 10-075770 | 3/1998 |
| JP | 10-113162 | 5/1998 |
| JP | 11-056336 | 3/1999 |

OTHER PUBLICATIONS

A copy of the Chinese Patent Office Action for corresponding Chinese patent application No. 01822990.5 dated Mar. 25, 2005.

* cited by examiner

*Primary Examiner*—Milton I. Cano
*Assistant Examiner*—Adepeju O. Pearse
(74) *Attorney, Agent, or Firm*—Armstrong, Kratz, Quintos, Hanson & Brooks, LLP

(57) ABSTRACT

Fermented malt beverages with reinforced filling taste and fullness of mouthfeel are manufactured by addition of α-glucosidase prior to a heat treatment in a wort production process in the course of manufacturing fermented malt beverages Production of acetic acid can be reduced by addition of α-glucosidase in the fermentation process in the high gravity brewing of beer. Further, low-calorie beers are manufactured by the method in which α-glucosidase is added in the fermentation process in brewing of beer and thereby real fermentation degree is enhanced.

15 Claims, 15 Drawing Sheets

Effect of α-Glucosidase dosage on sugar composition of wort

Sugar compositions before and after fermentation

FIG. 3

Analysis of beer compornents (1)

|  | α-GLU addition | No addition |
|---|---|---|
| Alcohol (%) | 4.41 | 5.95 |
| Apparent extract (%) | 4.84 | 1.76 |
| Real extract (%) | 6.42 | 3.89 |
| Original extract of wort (%) | 13.0 | 12.9 |
| Apparent degree of fermentation (%) | 62.8 | 86.4 |
| Real degree of fermentation (%) | 58.7 | 76.0 |

Analysis of beer compornents (2)

|  | α-GLU addition | No addition |
|---|---|---|
| Color (EBC) | 11.9 | 10.8 |
| pH | 4.78 | 4.63 |
| Acidity (mL) | 2.29 | 2.29 |
| Protein (%) | 0.82 | 0.74 |
| Amino acid (%) | 0.30 | 0.26 |
| Carbon dioxide (g/L) | 4.68 | 4.65 |
| Bitterness unit (BU) | 24.0 | 25.4 |

Analysis of beer compornents (3)

|  | α-GLU addition | No addition |
|---|---|---|
| Phosphoric acid | 976 | 850 |
| Citric acid | 288 | 295 |
| Pyruvic acid | trace | 46.7 |
| Malic acid | 153 | 146 |
| Succinic acid | 87.3 | 86.1 |
| Lactic acid | 79.2 | 89.8 |
| Acetic acid | 86.3 | 105 |
| Pyroglutamic acid | 273 | 244 |

( Unit: ppm )

Analysis of beer compornents (4)

|  | α-GLU addition | No addition |
|---|---|---|
| Ethyl acetate | 28.7 | 35.2 |
| n-Propanol | 6.72 | 11.5 |
| i-Butanol | 14.0 | 14.0 |
| Isoamyl acetate | 1.19 | 1.32 |
| i-Amyl alcohol | 41.1 | 56.9 |
| Ethyl caproate | 0.18 | 0.31 |

( Unit: ppm )

FIG. 4
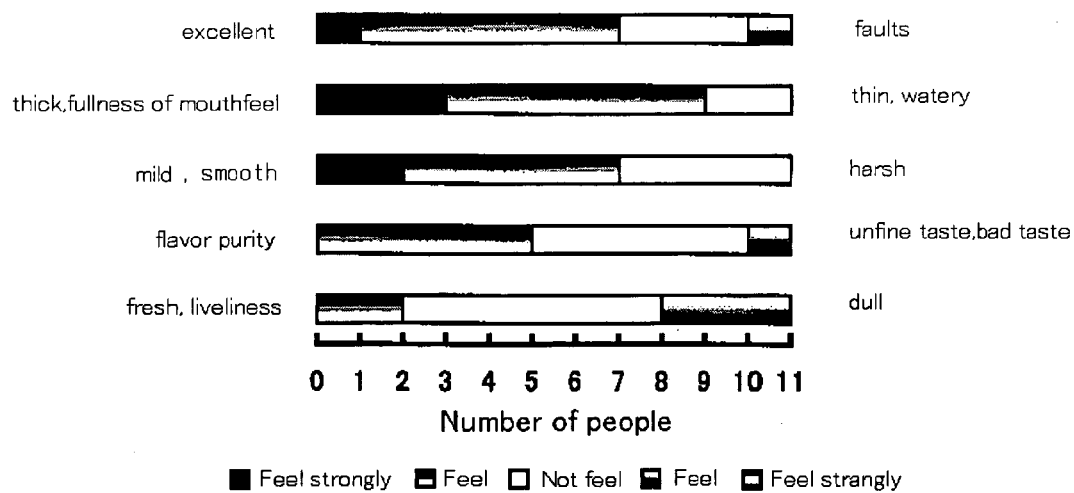
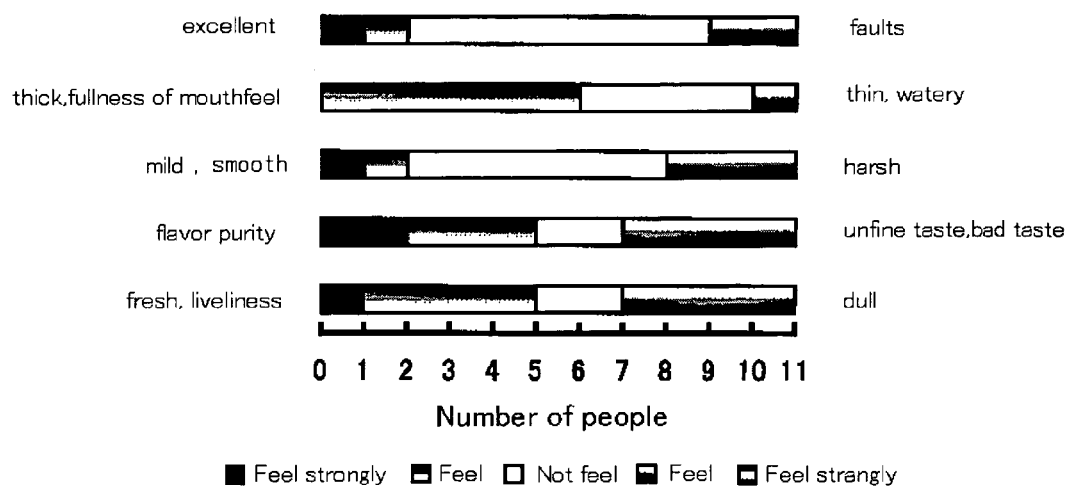

Effect of α-GLU addition on sugar comsition of wort

Effect of α-GLU addition on sugar comsition of wort

Temperature diagram during mashing

FIG. 10

|  | Brewer's yeast No addition | Sake yeast α-GLU addition | Sake yeast GA addition |
|---|---|---|---|
| Alcohole (v/v) | 8.84 | 11.0 | 11.0 |
| Real extract (w/w%) | 7.02 | 4.09 | 3.90 |
| Original extract (w/w%) | 19.8 | 20.1 | 20.2 |
| Glucose (%) | 0.02 | 0.17 | 0.08 |
| Maltose (%) | 0.07 | 0.03 | 0.11 |
| Malttriose (%) | 0.97 | 0.33 | 0.24 |
| Malttetraose (%) | 0.17 | — | 0.02 |
| Citric acid (ppm) | 449 | 456 | 446 |
| Malic acid (ppm) | 214 | 259 | 265 |
| Succinic acid (ppm) | 134 | 285 | 255 |
| Lactic acid (ppm) | 135 | 187 | 168 |
| Acetic acid (ppm) | 140 | 139 | 288 |
| Ethyl acetate (ppm) | 84.8 | 93.5 | 112 |
| 1-Propanol (ppm) | 22.2 | 23.8 | 24.6 |
| Isoamyl acetate (ppm) | 4.37 | 7.84 | 7.35 |
| Isoamyl alcohol (ppm) | 76.5 | 58.0 | 61.0 |
| Ethyl caproate (ppm) | 0.34 | 1.85 | 1.62 |
| Amino acid (ppm) | 3480 | 3250 | 3410 |

α-GLU : α-Glucosidase          GA : Glucoamylase

METHOD OF MANUFACTURING FERMENTED MALT BEVERAGES

CROSS REFERENCE TO RELATED APPLICATIONS

This application is a continuation of international application No. PCT/JP01/11671, filed Dec. 28, 2001, which claims priority to Japanese application No. 2001-291, filed Jan. 5, 2001 and Japanese application No. 2001-59573 filed Mar. 5, 2001.

FIELD OF THE INVENTION

The present invention relates to a method of manufacturing fermented malt beverages such as beers and high adjunct beers. In detail, the first aspect of the present invention relates to a method of manufacturing fermented malt beverages in which filling taste and fullness of mouthfeel of the beverage can be reinforced by addition of α-glucosidase in the process. The second aspect of the present invention relates to a method of high gravity brewing which can accelerate the fermentation to reduce the amount of acetic acid produced, and to a method of manufacturing low-calorie beers without influence of the concentration of original extract of wort. Also, it relates to a method of manufacturing beers in which a yeast for brewing other than a brewer's yeast may be used in high gravity brewing of beers or in a method of manufacturing low-calorie beers.

BACKGROUND OF THE INVENTION

In a usual process of manufacturing beers, starch derived from ingredients including malt is hydrolyzed by hydrolases (α-amylase, β-amylase) and fermentable sugars such as glucose, maltose, and maltotriose, which a brewer's yeast can metabolize, and oligosaccharides larger than maltotetraose and dextrin are produced. The fermentable sugars are metabolized by a brewer's yeast and converted to the components of beer such as alcohol. It is said that oligosaccharides larger than maltotetraose and dextrin may remain in the beer without being metabolized and may participate in filling taste and fullness of mouthfeel of the beverages. Besides, isomaltooligosaccharides produced by α-glucosidase from malt may give filling taste and fullness of mouthfeel of the beer, but their concentrations are too low to influence the taste of the beer.

There is a method to increase the concentration of isomaltooligosaccharides by addition of isomaltooligosaccharides syrup in beers and high adjunct beer (Japanese Patent Application Publication No. 7-51045, Japanese Patent Application Publication No. 7-327659). In these methods, however, kinds and amounts of adjuncts are limited because it is essential to use isomaltooligosaccharides syrup as a adjunct. In addition, adjuncts are used in these methods, which means that these methods cannot be applied to the so-called all malt beers brewing.

On the other hand, a trial to reinforce filling taste and the like by using α-glucosidase in a method of manufacturing low alcohol beers has been performed. For example, in the method of manufacturing disclosed in Japanese Patent Application Publication No. 5-68529, there is an attempt to reinforce filling taste and the like by production of isomaltooligosaccharides through addition of α-glucosidase (another name; transglucosidase) to the boiling-treated wort in the wort production process. In detail, after wort boiling in the wort production process a ratio of the fermentable sugars in wort can be reduced by addition of α-glucosidase to wort in which the concentration may be adjusted not more than 10 weight %, so that filling taste of beers similar to that of the usual alcohol concentration beers may be given. In this method in which α-glucosidase is added after the concentration adjustment, however, there is the following problem. That is, α-glucosidase may remain in wort or fermented wort in the fermentation and maturating processes which follow the wort production process, and then, once produced, isomaltooligosaccharides may be hydrolyzed by the enzyme to glucose and then the concentration of isomaltooligosaccharides may be decreased.

Meanwhile, the following arts are known in the high gravity brewing of beers and in the low-calorie beer brewing. The high gravity brewing is a method to ferment the high concentration of original extract in manufacturing beers. Concretely, wort in which the concentration of original extract of wort is usually 13–16 weight % is fermented and matured, and the product is diluted with carbonated water to the designated concentration prior to shipping. The high gravity brewing has an advantage of enhancing productive efficiencies of manufacturing equipment such as fermentation and lagering tanks and curtailing energy costs. Therefore, it is widely used in European countries and the United States, whereas the problem that it takes a long time to ferment a great volume of wort extract is indicated. The method to promote the fermentation in the high gravity brewing includes (1) to accelerate the viability and growth of the yeast by supplying a great volume of oxygen, (2) to use fresh yeast, and (3) to supply free-amino nitrogen. Besides, there is a problem that beer flavor manufactured in the high gravity brewing may be different from that of beers in a usual method. Especially, the original extract of wort is high in the high gravity brewing, and since a brewer's yeast is exposed to conditions of high osmotic pressure, expression of acetaldehyde dehydrogenase gene is generally induced. Because acetic acid, an off-flavor of beers, is produced from acetaldehyde, it has been desired to reduce its production.

Meanwhile, low-calorie beer, also called as diet beer, is a general name of beers with low calories. According to the art of beer brewing, low-calorie beer is defined as that with carbohydrate at 0.75 g/100 g or less and with fermentation degree of 90–92%. On the other hand, light beer is a general name of beers having lighter flavor than that of usual beers. Although it is not standardized on the quality and the method of manufacturing, it has generally lower calories than that of usual beers and is counted as one of low-calorie beers. The method to manufacture low-calorie beers includes (4) to ferment using diluted wort less than 10 weight % of original extract, or to dilute usual beers produced from wort at 12–13 weight % of original extract, (5) to ferment highly using dextrin-hydrolyzing enzymes (glucoamylase, debranching enzyme, α-amylase derived from mold, malt enzyme etc.), (6) to use dextrin-metabolizing yeast including recombinant yeast, (7) to ferment highly by supplying glucose to wort, (8) to dilute beer manufactured through the high gravity brewing, and (9) to ferment separately not less than two kinds of wort with different concentrations of original extract, to mix them to make the concentration the designated one, and to re-ferment and mature and the like.

Enzymes from malt such as β-amylase are used to saccharify ingredients such as malt in the process of manufacturing beers. Then, because maltose is a major carbon-source in wort, a sake yeast and wine yeast other than a brewer's yeast, which are less able to metabolize maltose have not been able to be employed in the manufacturing beers.

SUMMARY OF THE INVENTION

As described above, there has been no method to reinforce efficiently filling taste and fullness of mouthfeel of the beverages in the process of manufacturing fermented malt beverages having usual alcohol concentrations. That is, there have been problems that in the above-mentioned method to add isomaltooligosaccharides, since it is essential to use isomaltooligosaccharides as a adjunct, they cannot be used to 100% malt beers (without the adjunct), and that kinds and amounts of adjuncts are limited in the case of using a adjunct such as rice or starch. Also, the above-mentioned method to add α-glucosidase is for giving filling taste of low alcohol concentration beers, but cannot be applied to fermented malt beverages with usual alcohol concentration beers.

Thus, the first aspect of the present invention has been performed to provide a method of manufacturing fermented malt beverages in which filling taste and fullness of mouthfeel of the beverages can be reinforced. Especially, it aims to provide a method of manufacturing fermented malt beverages having usual alcohol concentrations and 100% malt beers with reinforced filling taste and fullness of mouthfeel of the beverages.

The present invention has been made based upon such a subject and we have found that new fermented malt beverages with reinforced filling taste and fullness of mouthfeel can be manufactured by addition of α-glucosidase prior to the heat treatment in the wort production process to produce isomaltooligosaccharides. That is, the first aspect of the present invention provides the followings.

[1] A method of manufacturing fermented malt beverages, wherein α-glucosidase is added prior to heat treatment in the wort production process in the course of manufacturing the fermented malt beverages.

[2] The method of manufacturing of [1], wherein heat treatment is boiling treatment.

[3] The method of manufacturing of [1] or [2], wherein the α-glucosidase is added simultaneously with ground malt.

[4] The method of manufacturing of [1] or [2], wherein the α-glucosidase is added to the mash prior to the heat treatment in the wort production process.

[5] The method of manufacturing of [1] or [2], wherein the α-glucosidase is added in the malting process.

[6] The method of manufacturing of any one of [1] to [5], wherein only malt is used as an ingredient.

[7] The method of manufacturing of any one of [1] to [5], wherein malt and adjuncts are used as sugar ingredients.

[8] Fermented malt beverages manufactured by the method of any one of [1] to [7].

On the other hand, in the above-mentioned methods (1) to (3) to promote the fermentation in the high gravity brewing, there is a problem that the process of manufacturing is too complicated. Also, there has been no report on the art to reduce acetic acid production in the high gravity brewing. Furthermore, the process of manufacturing is also too complicated in the above-mentioned methods (4) to (9) to manufacture low-calorie beers, and the produced beers have lost filling taste and fullness of mouthfeel in their quality. Because there are further problems that the beers are inferior in flavor because of effect of contaminating enzymes and insufficient efficacy of enzymes, and that it is hard to produce low-calorie beers from high gravity wort used in the high gravity brewing, a new simple process of manufacturing low-calorie beers, the market of which is expected to be enlarged because of health reasons and preference of light and clear taste by the consuming public. Besides, local beer brewers have also desired an efficient method of manufacturing beers with a new quality due to the growth of the beer industry.

Thus, the second aspect of the present invention has been made based upon the above subject, and aims to provide a method of manufacturing beers in which fermentation is promoted and production of acetic acid is reduced in spite of the high gravity brewing, and an efficient method of manufacturing beers with a new quality which cannot be made by a usual brewer's yeast. The present invention also aims to provide a method of manufacturing low-calorie beer with high quality which can be manufactured without depending on original extract content by a simple process as a result of enhancement of real fermentation, and a method of manufacturing low-calorie beer with new quality which cannot be achieved by using a brewer's yeast.

The present invention has been made based upon such a subject, and we have found that fermentation can be promoted and production of acetic acid can be reduced by addition of α-glucosidase in the fermentation process in spite of the high gravity brewing, and that new beers with new quality can be made by a yeast for brewing other than a brewer's yeast. That is, the second aspect of the present invention provides the following processes.

[9] A method of manufacturing beers, wherein α-glucosidase is added in the fermentation process in the high gravity brewing.

[10] A method of manufacturing beers wherein α-glucosidase is added in the fermentation process in the high gravity brewing to reduce acetic acid production.

[11] The method of manufacturing beers of [9] or [10], wherein a yeast for brewing other than a brewer's yeast is used.

[12] The method of manufacturing beers of [11], wherein the yeast for brewing other than a brewer's yeast is any one or more selected from the group consisting of a sake yeast, a wine yeast, and a shochu yeast.

[13] The method of manufacturing beers of any one of [9] to [12], wherein the concentration of original extract of wort is 13–30 weight %.

[14] The method of manufacturing beers of any one of [9] to [13], wherein the amount of α-glucosidase used is 50–400 ppm per the malt amount.

Furthermore, we have found that dextrin and oligosaccharides can be hydrolyzed and little sugars remain by addition of α-glucosidase in the fermentation process in spite of more than 10 weight % of the original concentration, and that low-calorie beers with new quality can be made by a yeast for brewing other than a brewer's yeast. That is, the second aspect of the present invention further provides the followings.

[15] A method of manufacturing low-calorie beers, wherein α-glucosidase is made to act in the fermentation process to enhance real degree of fermentation in brewing.

[16] The method of manufacturing low-calorie beers of [15] wherein a brewer's yeast or a yeast for brewing other than a brewer's yeast is used.

[17] The method of manufacturing low-calorie beers of [16], wherein a yeast for brewing other than a brewer's yeast is any one or more selected from the group consisting of a sake yeast, a wine yeast, and a shochu yeast.

[18] The method of manufacturing low-calorie beers of any one of [15] to [17], wherein the concentration of original extract is over 10 and not more than 30 weight %.

[19] The method of manufacturing low-calorie beers of any one of [15] to [18], wherein the amount of α-glucosidase used is 50–400 ppm per the malt amount.

BRIEF DESCRIPTION OF THE DRAWINGS

These and other objects and technical advantages of the present invention will be readily apparent from the following description of the preferred exemplary embodiments of the invention in conjunction with the accompanying drawings, in which:

FIG. 3 is a table showing a result to analyze the components of beer manufactured in Example 2. α-GLU indicates α-glucosidase.

FIG. 4 is a table showing a result to evaluate the sensory test for beer in Example 3.

FIG. 10 is a table showing a result to analyze the components of beer manufactured using a sake yeast.

DETAILED DESCRIPTION OF THE INVENTION

Figure 1:
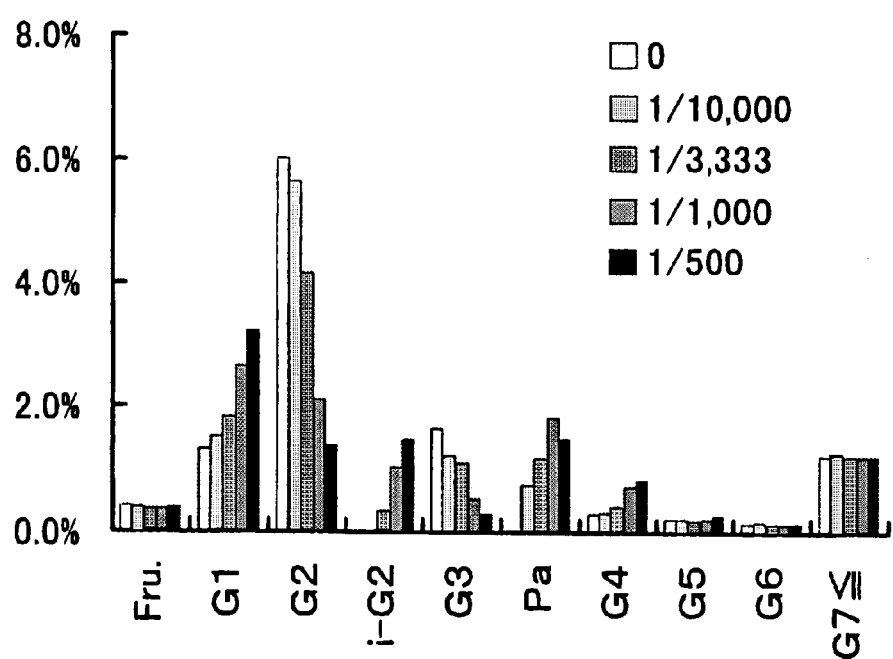
FIG. 1 is a graph showing a result (amount of α-glucosidase added and sugar composition of wort) to analyze sugar composition before fermentation in Example 1 according to a gel filtration method using HPLC and absorption-distribution method. Fru indicates fructose, and G1; glucose, G2; maltose, i-G2; isomaltose, G3; malttriose, Pan; panose, i-G3; isomaltotriose, G4; maltotetraose, G5; maltopentaose, G6; maltohexaose, G7; maltoheptaose, respectively.

At first, the first aspect of the present invention is explained. The first aspect of the present invention is a method of manufacturing fermented malt beverages characterized by addition of α-glucosidase prior to heat-treatment in the wort production process in the manufacturing fermented malt beverages.

Fermented malt beverage is a concept of beverages including so-called 100% malt beers (pure malt beers), the sugar ingredient of which is only malt, beers which are made from the adjunct such as rice and refined starch by the designated amounts in addition to malt, and so-called high adjunct beer which is made from ingredients containing malt whose amount is less than the constant one. Fermented malt beverages in the present invention include those with alcohol of about 4.1 to about 15.0 weight %. Preferably, they include those with alcohol of about 4.1 to about 8.0 weight %. Adjusting the extract concentration in the wort production process can make final products with the desired concentration of alcohol.

In the method of manufacturing in the present invention, α-glucosidase is added prior to heat-treatment in the wort production process. Except for addition of α-glucosidase prior to heat treatment in the wort production process, the beverages can be made in the same process as that for previous fermented malt beverages.

A part of sugar ingredient is converted to isomaltooligosaccharides such as isomaltose and panose as a result of the addition of α-glucosidase.

Now, a method of manufacturing fermented malt beverages is generally composed of a series of the processes including a malting process, a wort production process, a fermentation process, and a lagering (maturation) process. Malting process is a process in which barley is germinated to produce malt and the green malt is kilned and its root is removed and stocked. In a wort production process, brewing water is added to ground malt and starch is converted to sugars by enzymes included in malt to make mash. In the process of manufacturing beers with adjuncts, the adjuncts such as rice and starch are also added with brewing water and thereby sugars derived from them are also produced. Mash is lautered and then boiled after hops are added. Such boiling-treatment is performed in order to inactivate enzymes in wort, to make wort clear by precipitating proteins, to extract and isomerize hop components, and to sterilize. Subsequently, the extract of the wort is adjusted to the designated one by the addition of water to the wort after boiling. After cooling of the wort obtained in the wort production process, it is submitted to the fermentation process. In a fermentation process, a yeast is added and sugars in the wort are converted to alcohol. Thus obtained beer is called as young beer. In a maturation process, young beer is placed calmly for the designated period, and lagered to mature.

In the method of manufacturing in the present invention, α-glucosidase is added prior to heat-treatment (wort boiling) in the wort production process. Therefore, α-glucosidase is added in the malting process or before wort boiling in the wort production process. By addition of α-glucosidase, isomaltooligosaccharides such as isomaltose and panose are produced by the action of α-glucosidase in mash or wort on malt-dextrin and oligosaccharides in the wort production process.

In the present invention, "heat-treatment in the wort production process" indicates for example boiling-treatment in general process of manufacturing described above. That is, in this case α-glucosidase is added prior to boiling-treatment (aims of which are to inactivate enzymes in wort and to precipitate proteins) in the wort production process. Thus, if a part of the process of the previous manufacturing is adopted as "heat-treatment in the wort production process" in the present invention, no additional process is necessary and a new type of the beverages with new filling taste can be made in the process as similar to that for previous beverages except for addition of α-glucosidase.

However, "heat-treatment in the wort production process" in the present invention is not limited to a boiling treatment as described above but may be a process in which α-glucosidase added can be inactivated at least. Therefore, another process can be provided separately to achieve the above aims and it can be made "heat-treatment in the wort production process" in the present invention. Also in this case, the heat-treatment can be boiling-treatment.

Preferably, α-glucosidase is added in the end of a malting process or in the early stage of a wort production process. By this treatment, α-glucosidase can act fully by the addition of α-glucosidase at the early stage in the course of manufacturing, and it is possible that larger amounts of isomaltooligosaccharides may be produced. For example, α-glucosidase can be added simultaneously with addition of ground malt into warm water, or α-glucosidase may be added to ground malt and then the mixture may be added to warm water. Besides, after ground malt is added in warm water, α-glucosidase may be added to the mixture. On the other hand, α-glucosidase may be added after mash is prepared by adding ground malt to warm water.

Also, α-glucosidase can be added in a malting process.

In the case of using adjuncts, α-glucosidase can be added in wort production process simultaneously with the adjuncts.

Amounts of isomaltooligosaccharides produced can be adjusted by adjusting the schedule of addition of α-glucosidase.

Origin of α-glucosidase in the present invention is not limited but generally one on the market can be used, for example, α-glucosidase "Amano" (Amano Enzyme Inc.) or Transglucosidase L "Amano" (Amano Enzyme Inc.).

Produced isomaltooligosaccharides may affect filling taste and fullness of mouthfeel of the fermented malt beverages. Amount of isomaltooligosaccharides produced are adjusted by amount of α-glucosidase added, and consequently filling taste and fullness of mouthfeel of the beverages can be adjusted. Although amount of α-glucosidase added is not limited especially, but preferably α-glucosidase may be added from 1/10,000 to 1/500 of weight of ingredients. More preferably α-glucosidase may be added in the range of 1/5,000 to 1/1,000 of weight of ingredients. Concentration of alcohol in the finished beer is adjusted by adjusting original extract of wort prior to a fermentation process as in the previous method of manufacturing.

It is also possible that various saccharide hydrolysases such as α-amylase, β-amylase, and debranching enzymes can be used concomitantly with α-glucosidase.

Next, the second aspect of the present invention is explained. In the second aspect of the present invention, concentration of original extract is desired to be 13–30 weight % in the high gravity brewing, more preferably 18–25 weight %. In general, the high gravity brewing is performed in which original extract of wort is 13–16 weight %. It is because at higher concentration of the extract than 13 weight %, the above-mentioned advantages in the high gravity brewing can be obtained easily, whereas when the concentration exceeds 30 weight %, viscosity of wort is very high and it becomes difficult to filtrate it. The method for the preparation of high gravity wort includes (1) to change the ratio of malt to water for a wort production process (combination ratio for preparation), (2) to change the volume of warm water added for preparation of boiled extract, and (3) to use malt extract. Temperature for mashing can be controlled by the infusion method or by the decoction method.

In the second aspect of the present invention, in spite of high gravity brewing, fermentation can be promoted to reduce amount of acetic acid produced and beer can be manufactured by addition of α-glucosidase in a fermentation process. Origin of α-glucosidase added is not limited especially but anyone on the market can be suitably used, for example, α-glucosidase "Amano" (Amano Enzyme Inc.) or Transglucosidase L "Amano" (Amano Enzyme Inc.). α-Glucosidase can be added in a fermentation tank or used by immobilized-enzyme method. Although amount of α-glucosidase used is not limited especially, it is desired to be 50–400 ppm of wort, more preferably 100–200 ppm. At lower concentration of α-glucosidase used than 50 ppm, amount of acetic acid produced becomes greater, whereas when the concentration is over 400 ppm oligosaccharides are too quickly converted to glucose and not only control of osmotic pressure but also suppression of acetic acid production becomes insufficient.

Furthermore, because glucose is produced as a fermented sugar by addition of α-glucosidase in the fermentation process, a yeast to be used for the fermentation is not limited to a brewer's yeast, but any yeast for brewing such as a sake yeast, a wine yeast, and a shochu yeast can be employed optionally so that manufacturing beers with a new quality of filling taste and the like that is not obtained by using a brewer's yeast may become possible. Brewer's yeast can be used by itself or concomitantly with other yeast for brewing. Also, yeast for brewing other than a brewer's yeast can be used together. Any obtainable yeast including a brewer's yeast can be used suitably and for example, a sake yeast include K-9, K-14, and K-86 of Brewing Society of Japan.

Low-calorie beers can be also manufactured by addition of α-glucosidase in the fermentation process. Although the concentration of extract of wort is not limited especially, only little sugars remains after fermentation even in its range of 13–30 weight %. Therefore, manufacturing low-calorie beers with a high quality becomes possible while enhancement of efficiency of manufacturing facilities and reduction of energy consumption, benefits in the high gravity brewing, are attempted. α-Glucosidase added and a yeast for brewing employed is the same as those for the above-mentioned high gravity brewing of beers. Although amount of α-glucosidase added is not limited especially, it is desired to be 50–400 ppm of wort, more preferably 100–200 pm. At lower concentration of α-glucosidase than 50 ppm, real degree of fermentation is apt to decrease, whereas when the concentration is over 400 ppm amount of acetic acid produced becomes greater. Real degree of fermentation indicates the ratio of consumed extract against original extract without effect of alcohol.

Hereinafter, the present invention is explained in detail using Examples. Examples described hereinafter are used to explain the effects of the present invention but the present invention is not limited as the above explanations and Examples. Various variations are also included in the present invention as long as they are included in the scope of claim and they are conceived easily by those skilled in the art.

(The First Aspect of the Present Invention)

EXAMPLE 1

Amount of α-Glucosidase Added and Sugar Composition of Wort

Saccharification of mash was performed as follows. Ground malt and α-glucosidase "Amano" are added in the water for preparation pre-warmed at 46° C. Amount of α-glucosidase "Amano" added was 1/10,000–1/500 of that of ground malt. The mash mixture is heated with a rest at 46° C. for 30 min with stirring and then heated to 65° C. with 1° C. increase per min. It was further warmed at 65° C. for 80 min and then heated to 76° C. with 1° C. increase per min. It was warmed at 76° C. for 10 min so that saccharification was terminated. The saccharified mash was filtered through a filtration paper (No.2), and the filtrate was boiled. The resulted precipitation in the filtrate was removed by filtration through the filtration paper and the filtrate was diluted to prepare the concentration of original extract as 12 weight % of wort.

Sugar composition of the wort before fermentation was analyzed according to a gel filtration method using HPLC and absorption-distribution method.

As shown in FIG. 1, as amount of α-glucosidase "Amano" added was increased, production of maltose was decreased and isomaltose and panose, which are non-fermentable sugars, were increased. It is supposed that α-glucosidase "Amano" may act the produced maltose and generate the transglucosilation reaction. Production of glucose was also increased concomitantly and it is likely that this phenomenon may be caused by the transglucosilation reaction of α-glucosidase as the vice-reaction.

EXAMPLE 2

Manufacturing 100% Malt Beer by Addition of α-Glucosidase

Figure 2:
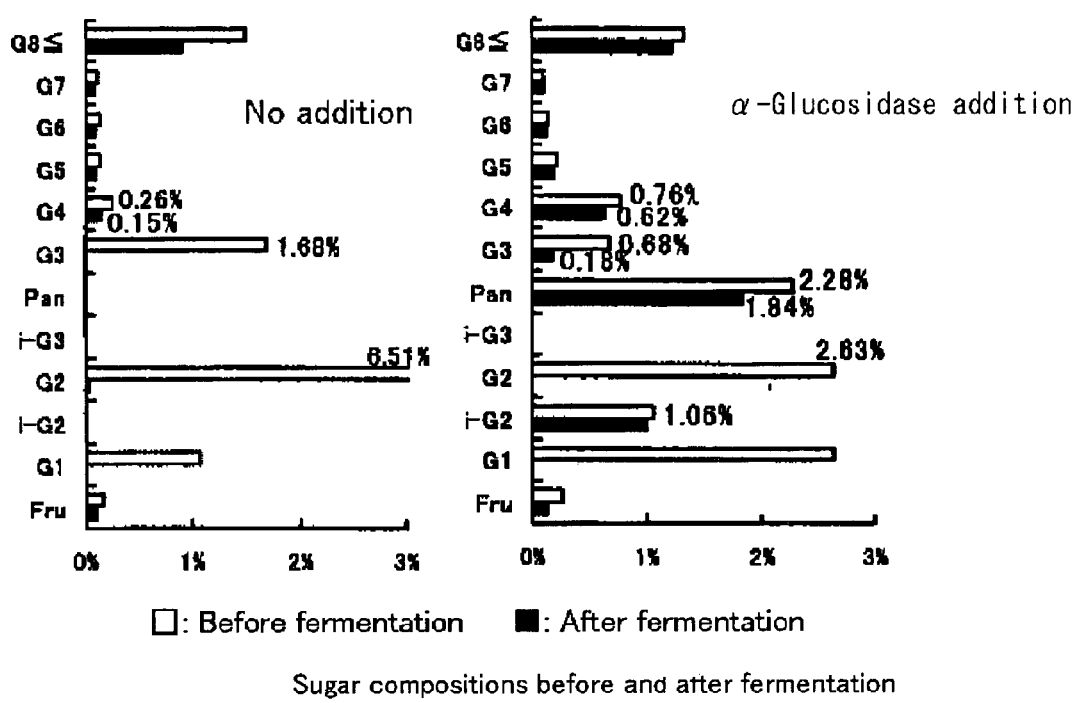
FIG. 2 is a graph showing sugar compositions before and after fermentation in Example 2. Fru indicates fructose, and G1; glucose, G2; maltose, i-G2; isomaltose, G3; maltotriose, Pan; panose, i-G3; isomaltootriose, G4; maltotetraose, G5; maltopentaose, G6; maltohexaose, G7; maltoheptaose, respectively.

Manufacturing 100% malt beer without any adjuncts was tried. Saccharification was performed using α-glucosidase "Amano" added at 1/1,000 of malt amount. Then, a brewer's yeast was added to wort whose extract was prepared to be about 13 weight %, and they were fermented for about 2 weeks to brew. Sugar compositions before and after fermentation are shown in FIG. 2.

Isomaltooligosaccharides such as isomaltose and panose produced by addition of α-glucosidase remained in the finished beers. Also, isomaltooligosaccharides larger than G4 were increased compared with the control group.

Analyzed values of composition of the manufactured beer are shown in the table in FIG. 3.

Concentration of alcohol was decreased because isomaltooligosaccharides were produced and fermentable sugars were reduced by addition of α-glucosidase. Furthermore, apparent extract was increased because isomaltooligosaccharides remained in the young beer even after fermentation. Addition of α-glucosidase did not affect pH, acidity, amino acid, carbon dioxide, or bitterness value.

EXAMPLE 3

The Sensory Evaluation

A sensory evaluation was performed by 11 assessors who were experts in brewing. In the group of α-glucosidase addition compared with the group without any enzyme preparation, senses of mild and fullness of mouthfeel were observed. Their comments showed charactaristics such as mild, fullness of mouthfeel, and smooth. On the other hand, in the group of no addition, negative evaluations such as dull and unfine taste were given although senses such as flavor purity and liveliness were also observed.

As a result of total evaluation according to 5 points method (1. very good, 2. good, 3. average, 4. bad, 5. very bad), the group of TG addition showed 2.45 points, whereas the group of no addition of TG showed 2.91 points, indicating that the group of α-glucosidase addition may be superior to the group of no addition in the evaluation.

EXAMPLE 4

Manufacturing Beer with Adjuncts by Addition of α-Glucosidase

Figure 5:
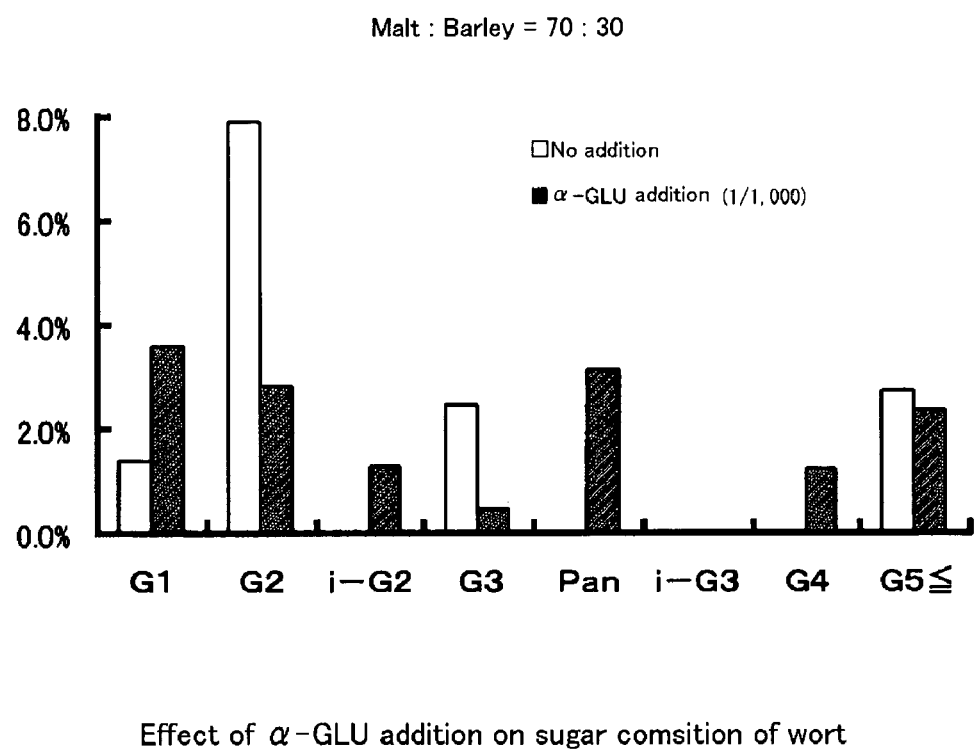
FIG. 5 is a graph showing a result to analyze sugar composition before fermentation in Example 4 according to a gel filtration method using HPLC and absorption-distribution method. G1 indicates glucose, and G2; maltose, i-G2; isomaltose, G3; maltotriose, Pan; panose, i-G3; isomaltotriose, G4; maltotetraose, and G5; maltopentaose, respectively. Also, α-GLU indicates α-glucosidase.

Beer, which is manufactured using adjuncts, was manufactured using the ingredient composed of 70 weight % malt and 30 weight % barley. Saccharification was performed using α-glucosidase "Amano" added at 1/1,000 of ingredient weights. Then, a brewer's yeast was added to the wort whose extract was prepared to be about 13 weight %, and they were fermented for about 2 weeks to brew. Sugar composition before fermentation is shown in FIG. 5.

Similarly to the case of 100% malt beer in Example 2, isomaltooligosaccharides such as isomaltose and panose remained in finished beer, and beer with good flavor could be manufactured.

EXAMPLE 5

Manufacturing High Adjunct Beer by Addition of α-Glucosidase

Figure 6:
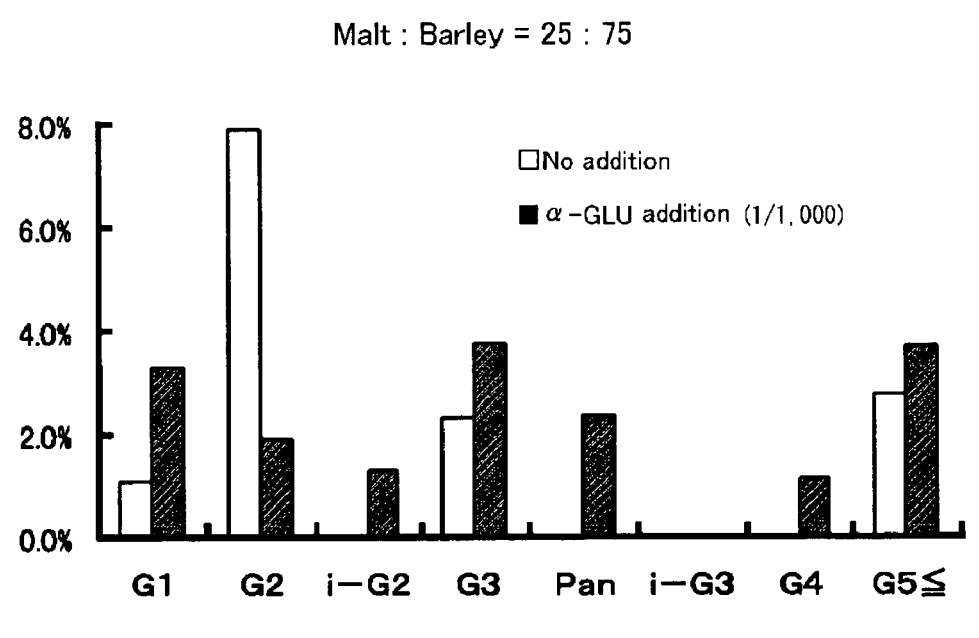
FIG. 6 is a graph showing a result to analyze sugar composition before fermentation in Example 5 according to a gel filtration method using HPLC and absorption-distribution method. G1 indicates glucose, and G2; maltose, i-G2; isomaltose, G3; maltotriose, Pan; panose, i-G3; isomaltotriose, G4; maltotetraose, and G5; maltopentaose, respectively. Also, α-GLU indicates α-glucosidase.

Beer, which is manufactured using adjuncts, was manufactured using the ingredient composed of 25 weight % malt and 75 weight % barley. Saccharification was performed using α-glucosidase added at 1/1,000 of the ingredients' weights. Then, a brewer's yeast was added to the wort whose extract was prepared to be about 13 weight %, and they were fermented for about 2 weeks to brew. Sugar composition before fermentation is shown in FIG. 6.

Similarly to the case of 100% malt beer in Example 2, isomaltooligosaccharides such as isomaltose and panose remained in the products, and high adjunct beer with good flavor could be manufactured.

(The Second Aspect of the Present Invention)

EXAMPLE 6

Figure 7:
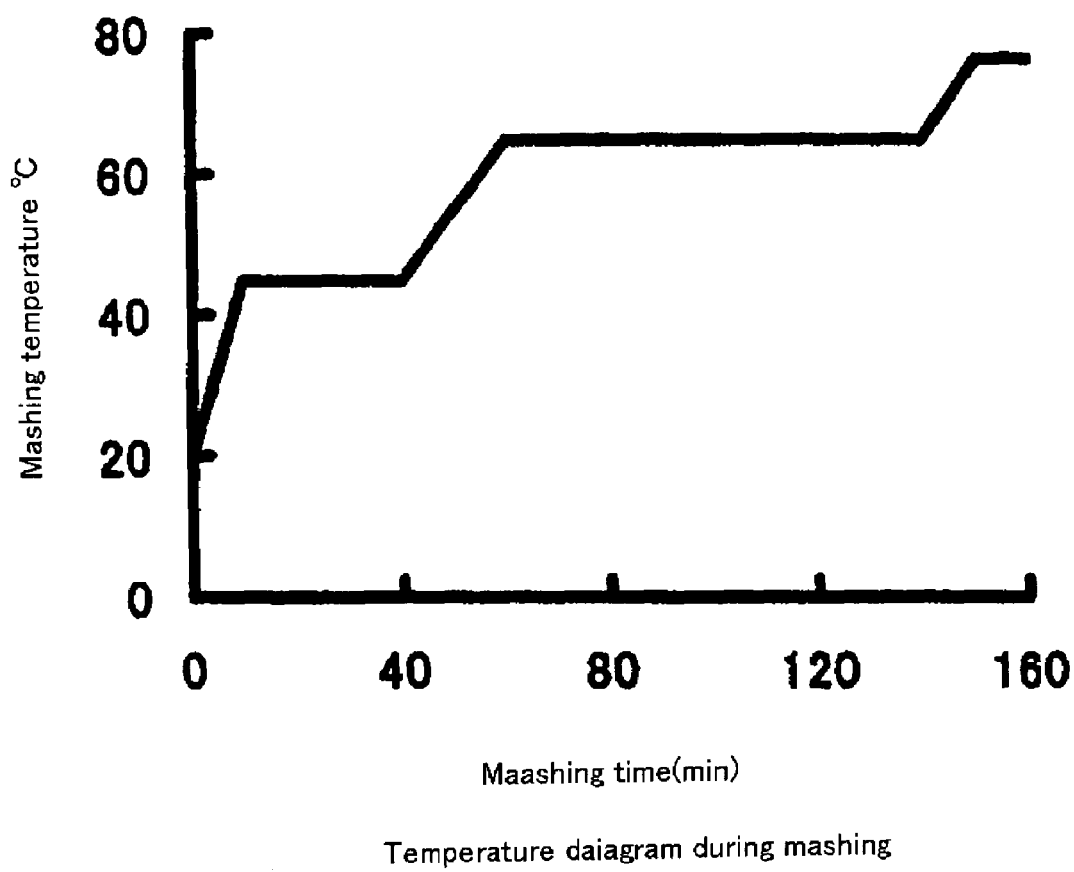
FIG. 7 is a graph showing a temperature pattern of mashing process in the high gravity brewing.

28 Kg of Ground malt was added in 84 L of brewing water so that wort whose original extract was 20 weight % was prepared according to the infusion method. Time-course of temperature in the infusion method is shown in FIG. 7.

Brewer's yeast (NCYC1245, National Collection of Yeast Cultures, the same hereinafter) was added by 2.5 g to 1 L of the obtained wort. Then, α-glucosidase (α-glucosidase "Amano", Amano Enzyme Inc., the same hereinafter) was added at 50, 100, 200 and 400 ppm of the wort and fermentation was performed at 15° C. for 21 days. For control group, fermentation was performed in the same manner as the above without addition of α-glucosidase.

Figure 8:
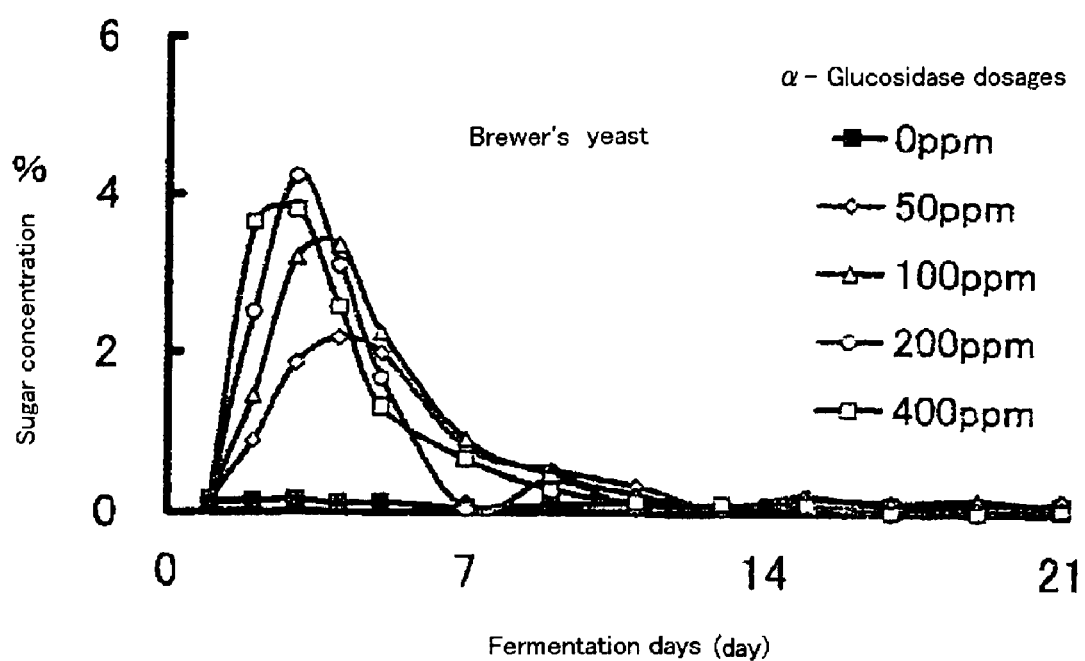
FIG. 8 is a graph showing a time-course change of branched oligosaccharides by addition of α-glucosidase during fermentation.
Figure 9:
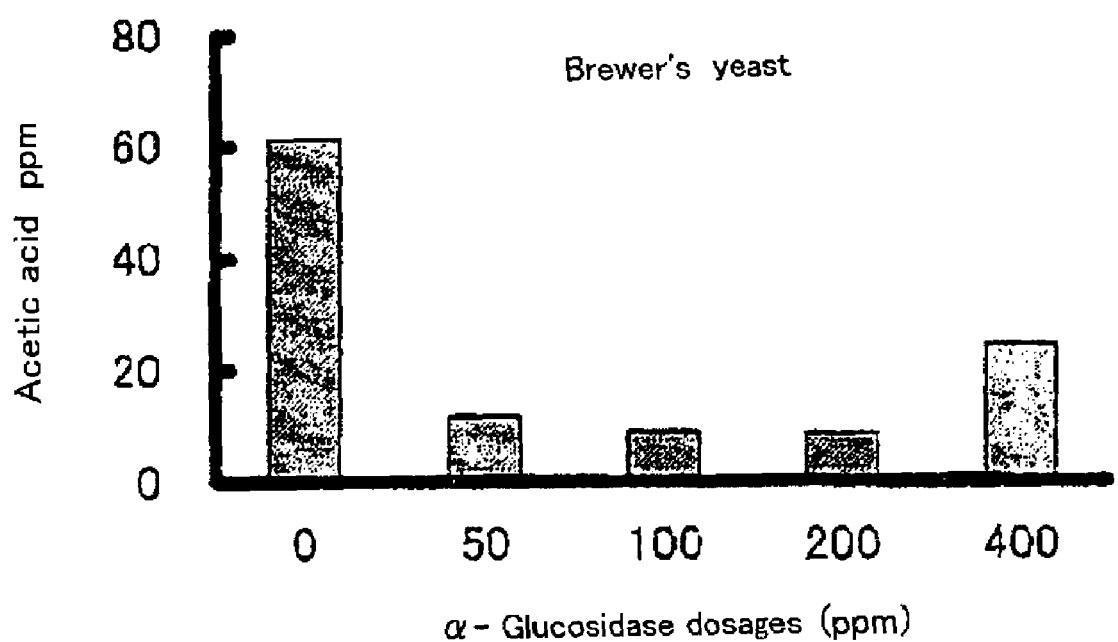
FIG. 9 is a graph showing a relationship between amount of acetic acid produced and amount of α-glucosidase added in a brewing using a brewer's yeast.

Among oligosaccharides which are known to contribute a decrease in osmotic pressure, panose and isomaltotriose have 3 polymerizations of glucose and are branched oligosaccharides which cannot be metabolized by yeast. Behaviors of panose and isomaltotriose are shown in FIG. 8. FIG. 8 indicates that panose and isomaltotriose may be produced by addition of α-glucosidase and these oligosaccharides may be hydrolyzed as the fermentation proceeds. Thus, temporary production of branched oligosaccharides by addition of α-glucosidase can suppress a sugar concentration in wort at early fermentation and a rapid increase in glucose so that it can prevent an increase in osmotic pressure. Consequently, induction of acetaldehyde dehydrogenase gene expression is suppressed and thereby production of acetic acid from acetaldehyde is suppressed. FIG. 9 shows a relationship between amount of acetic acid produced in beer and amount of α-glucosidase added. Addition of α-glucosidase remarkably decreased the amount of acetic acid produced. At 50 and 400 ppm additions, the amount of acetic acid produced showed a tendency to increase.

EXAMPLE 7

Wort whose original extract was 20 weight % was prepared according to the method as described in Example 6 and beer was manufactured in a 100 L-pilot plant. Each of a brewer's yeast and a sake yeast (K-14, Brewing Society of Japan, the same hereinafter) was used. When the brewer's yeast was used, no enzyme was added. When the sake yeast was used, in one group α-glucosidase was added at 400 ppm and in another group glucoamylase (glucoamylase "Amano" SD, Amano Enzyme Inc., the same hereinafter) was added at 200 ppm. In control group using a sake yeast, no enzyme was added and fermentation was performed in the same manner.

Figure 11:
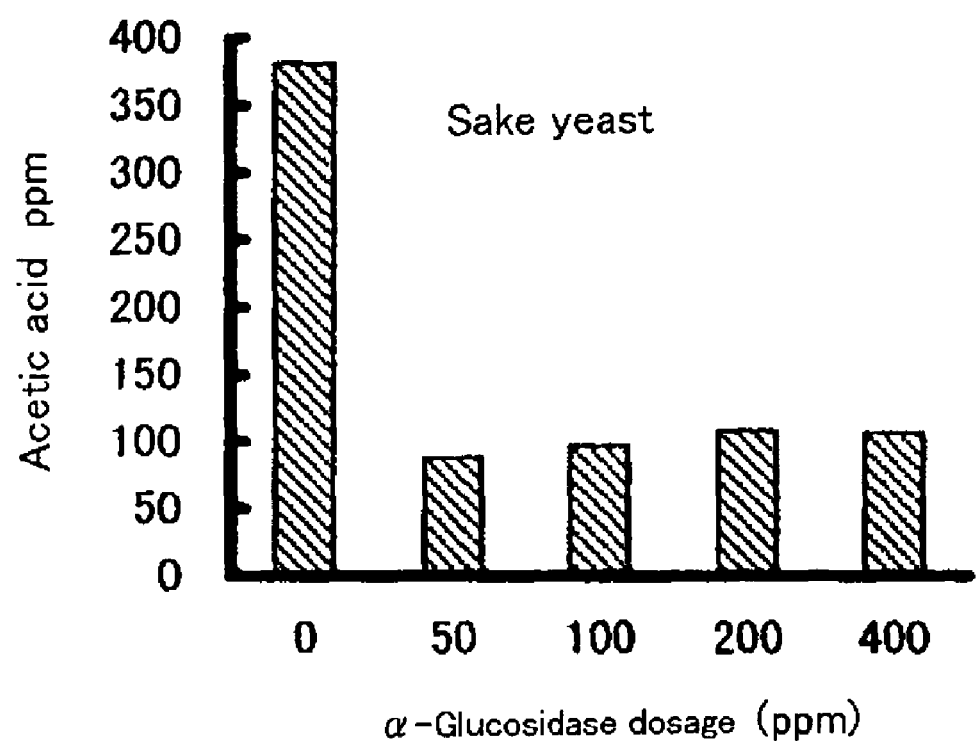
FIG. 11 is a graph showing a relationship between the amount of acetic acid produced and the amount of α-glucosidase added in a brewing using a sake yeast.

Results of componential analysis of beer manufactured are shown in a table in FIG. 10. In the case of α-glucosidase addition, the amount of acetic acid produced was suppressed more than the case of glucoamylase addition. It is supposed that an increase in the amount of acetic acid produced by addition of glucoamylase may be due to increase in osmotic pressure by a rapid increase in glucose production. As shown in the table in FIG. 10, it is suggested that employment of a sake yeast in beer brewing may increase components giving good flavor such as malic acid, succinic acid, and ethyl caproate so that beer with new qualities different from those of beers brewed using a brewer's yeast can be manufactured. FIG. 11 shows a relationship between amount of acetic acid produced in beer using a sake yeast and amount of α-glucosidase added. Addition of α-glucosidase remarkably decreased the amount of acetic acid produced even using a sake yeast as in the case of a a brewer's yeast.

EXAMPLE 8

28 Kg of Ground malt was added in 84 L of warm water so that wort whose original extract was 20 weight % was prepared according to the infusion method. Time-course of temperature in the infusion method is according to FIG. 7.

A brewer's yeast was added at 2.5 g per 1 L to the obtained wort. Then, α-glucosidase was added at 50, 100, 200 and 400 ppm of wort and fermentation was performed at 15° C. for 21 days. In control group, fermentation was performed in the same manner as in the above without addition of α-glucosidase.

Figure 12:
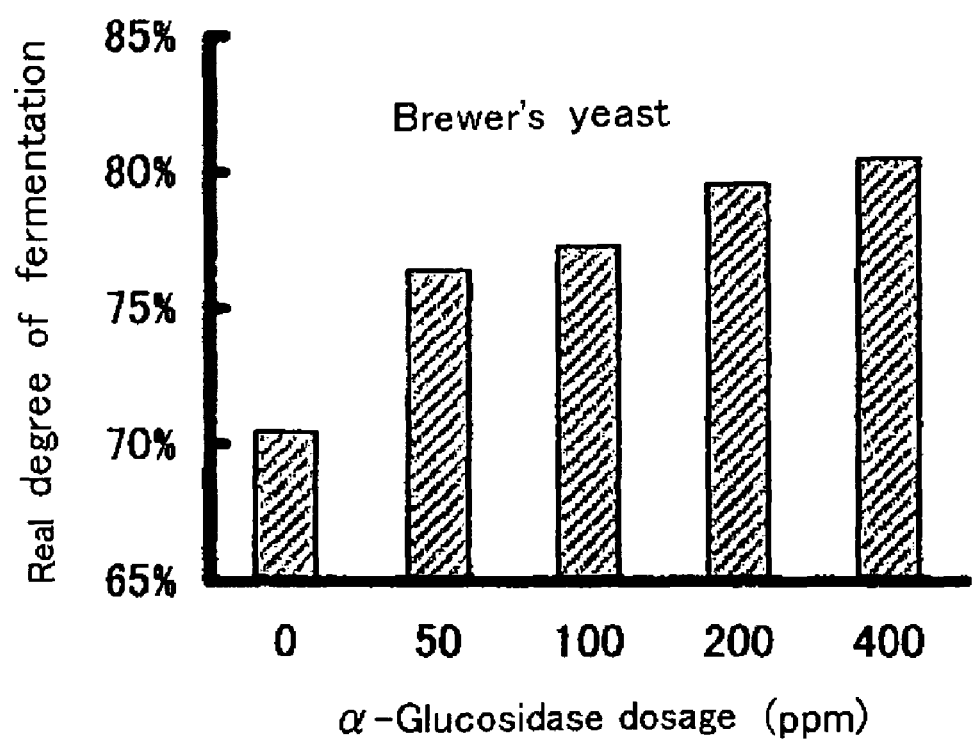
FIG. 12 is a graph showing a relationship between real degree of fermentation and the amount of α-glucosidase added in a brewing using a brewer's yeast.

Relationship between real degree of fermentation and amount of α-glucosidase added after fermentation is shown in FIG. 12. Addition of α-glucosidase remarkably increased real degree of fermentation so that low-calorie beer with less remaining sugars can be manufactured using a brewer's yeast.

Figure 13:
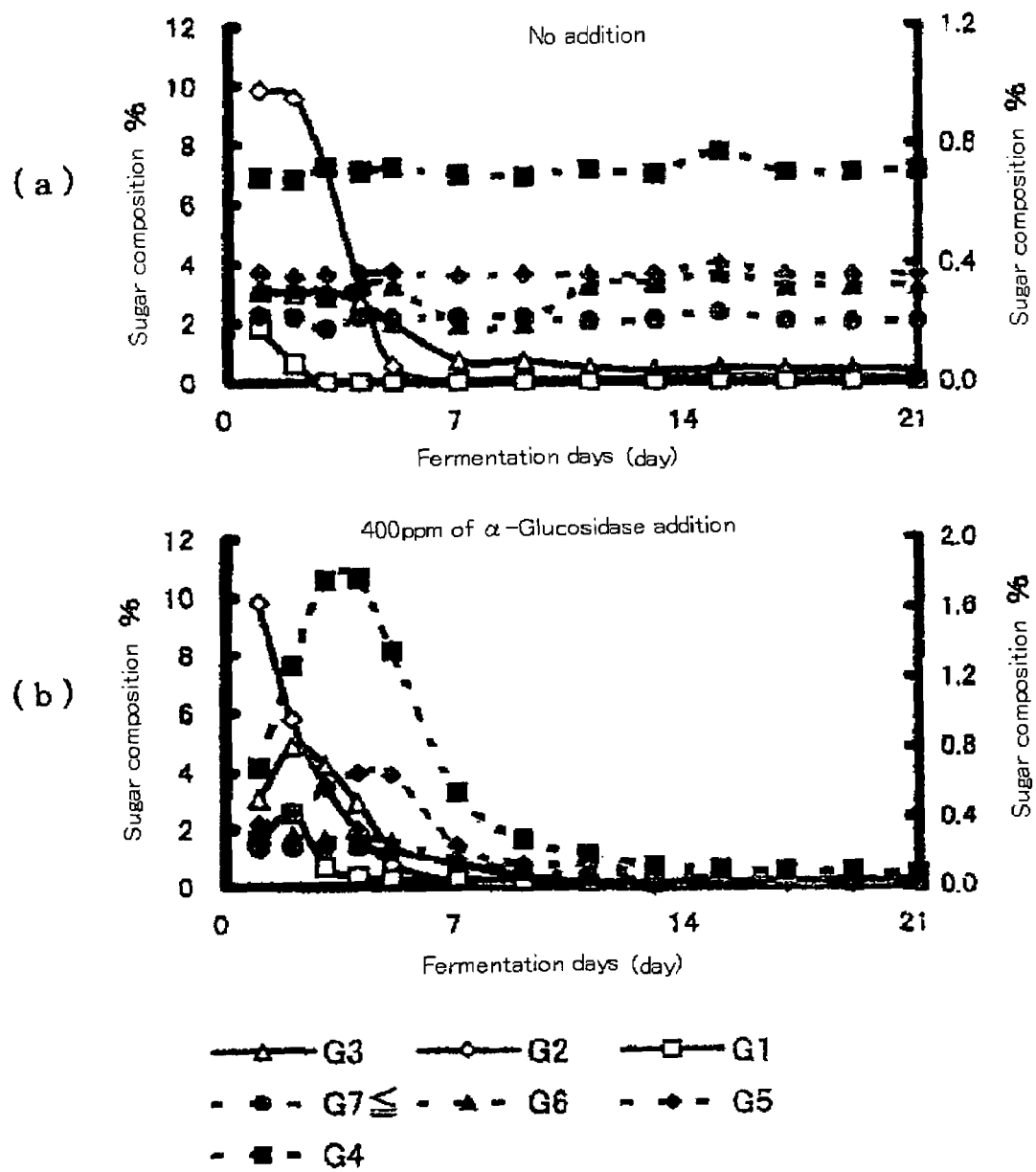
FIG. 13 is graphs showing (a) a time-course change of oligosaccharides by no addition of α-glucosidase and (b) a time-course change of oligosaccharides by addition of α-glucosidase.

A graph summarizing increase and decrease of sugars in fermentation individually by polymerization is shown in FIG. 13. In no addition group, maltotetraose (G4 in the graph), maltopentaose (G5 in the graph), maltohexaose (G6 in the graph), and larger sugars than maltoheptaose (G7≦in the graph) remained, whereas these oligosaccharides decreased as the progress of fermentation by addition of α-glucosidase (400 ppm).

EXAMPLE 9

Sake yeast was added at 2.5 g per 1 L to the wort prepared according to Example 8. Then, α-glucosidase was added at 50, 100, 200 and 400 ppm of wort and fermentation was performed at 15° C. for 21 days. In control group, fermentation was performed in the same manner as in the above without addition of α-glucosidase.

Figure 14:
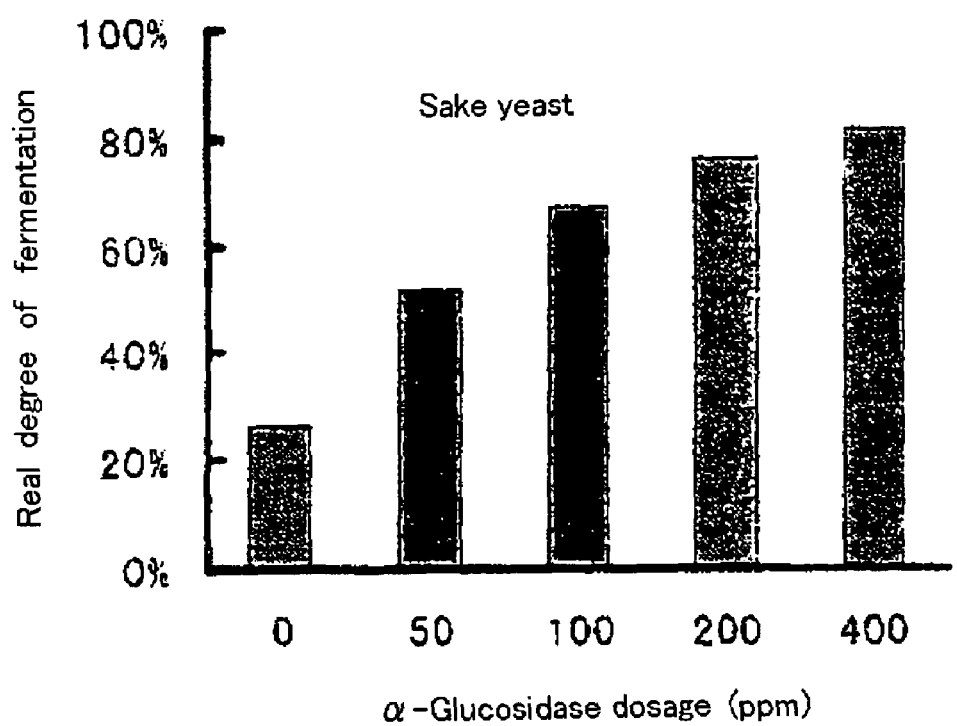
FIG. 14 is a graph showing a relationship between real degree of fermentation and the amount of α-glucosidase added in a brewing using a sake yeast.

Relationship between real degree of fermentation and amount of α-glucosidase added is shown in FIG. 14. Addition of α-glucosidase remarkably increased real degree of fermentation so that low-calorie beer with less remaining sugars can be manufactured using a sake yeast.

EXAMPLE 10

A wine yeast (W-1) were added at 2.5 g per 1 L to the wort prepared according to Example 8. Then, α-glucosidase was added at 50, 100, 200 and 400 ppm of wort and fermentation was performed at 15° C. for 21 days. In control group, fermentation was performed in the same manner as in the above without addition of α-glucosidase.

Figure 15:
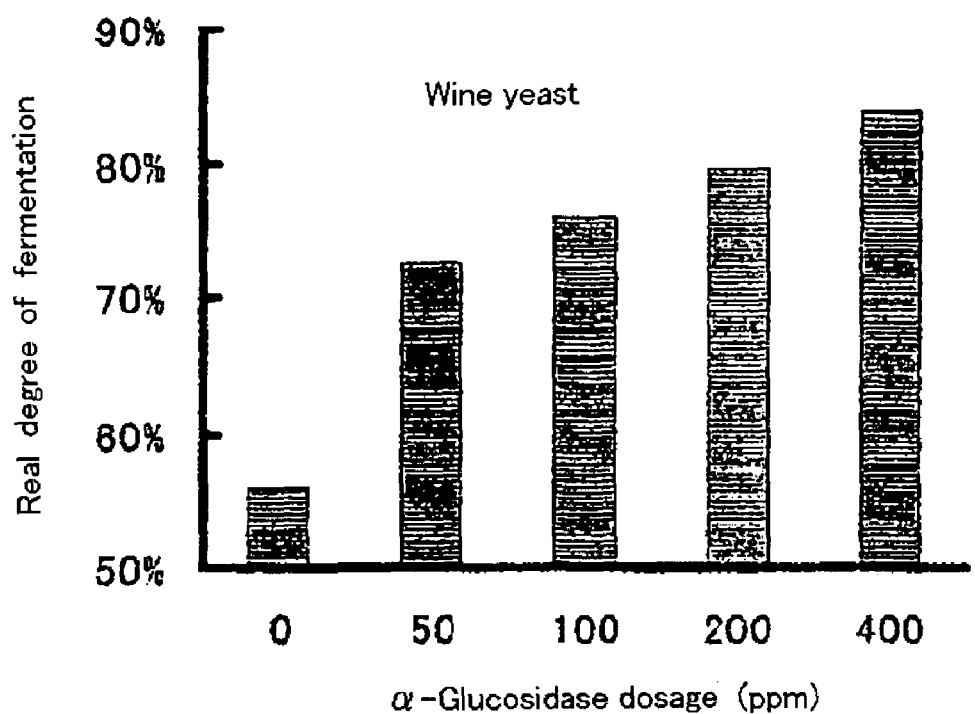
FIG. 15 is a graph showing a relationship between real degree of fermentation and the amount of α-glucosidase added in a brewing using a wine yeast.

Relationship between real degree of fermentation and amount of α-glucosidase added is shown in FIG. 15. Addition of α-glucosidase remarkably increased real fermentation degree so that low-calorie beer with less remaining sugars can be manufactured using a wine yeast.

Hereinafter, the following matters are disclosed.

(11) Fermented malt beverages manufactured by addition of α-glucosidase prior to the heat treatment in the wort production process.

(12) The fermented malt beverages of (11) characterized in that the heat treatment is boiling treatment.

(13) The fermented malt beverages of (11) or (12) characterized in that the α-glucosidase is added simultaneously with ground malt.

(14) The fermented malt beverages of (11) or (12) characterized in that the α-glucosidase is added to the saccharified solution prior to heat treatment in the wort production process.

(15) The fermented malt beverages of (11) or (12) characterized in that the α-glucosidase is added in the preparation process of malt.

(16) The fermented malt beverages of any one of (11) to (15) characterized in that only malt is used as an ingredient.

(17) The fermented malt beverages of any one of (11) to (15) characterized in that malt and adjuncts are used as sugar ingredients.

INDUSTRIAL APPLICABILITY

According to the method of manufacturing disclosed in the first aspect in the present invention, isomaltooligosaccharides are produced by addition of α-glucosidase and the resulted isomaltooligosaccharides remain in the final products without being metabolized by yeasts in a fermentation process which follows a wort production process. Because α-glucosidase is added prior to heat-treatment in a wort production process and is entirely inactivated through heat-treatment, the once produced isomaltooligosaccharides are not hydrolyzed to glucose by the enzyme in the following processes (fermentation and maturation). Thus, isomaltooligosaccharides produced by addition of α-glucosidase can be remained efficiently in the final products. As described above, fermented malt beverage with abundant isomaltooligosaccharides can be manufactured according to the method of manufacturing in the present invention.

In the first aspect of the method of manufacturing in the present invention, filling taste is also given to so-called 100% malt beer which is brewed using only malt as an ingredient. Also, in brewing of usual beer, it is unnecessary to use isomaltooligosaccharides syrup, and it is possible to select adjuncts according to the purpose.

Furthermore, because the beverages are manufactured in the same manner as in the previous method of manufacturing except for the addition of α-glucosidase prior to heat treatment in the wort production process, it is unnecessary to establish more facilities nor to alter the process and beers with filling taste and plentiful fullness of mouthfeel compared with conventional fermented malt beverages can be manufactured. Also, because isomaltooligosaccharides are produced by addition of α-glucosidase prior to heat treatment in the wort production process, more energetically efficient process of manufacturing can be performed in comparison to the process in which isomaltooligosaccharides syrup is prepared separately and added to the fermentation.

On the other hand, because the second aspect in the present invention is composed as described above, it exhibits the following benefits. According to the beer brewing method in the present invention, in spite of high gravity brewing, fermentation can be promoted by the addition of α-glucosidase to reduce the amount of acetic acid produced. Therefore, not only enhancement of efficiency of manufacturing facilities and reduction of energy expenses, which are benefits in the high gravity brewing, are able to be carried out, but also manufacturing beers with a high quality in flavor becomes possible. Besides, because in the high gravity brewing beers can be manufactured using any yeast for brewing other than a brewer's yeast, manufacturing beers with a new high quality such as filling taste becomes possible. Especially, supply of distinctive and characteristic beers may be possible in each local beer industry. Furthermore, because little sugars remain after fermentation by addition of α-glucosidase in the preparation process in the present invention, an efficient manufacturing low-calorie beer becomes possible in a simple process without influence of the concentration of wort. Besides, because also in the manufacturing low-calorie beer any yeast for brewing other than a brewer's yeast can be employed, manufacturing low-calorie beer with a new high quality such as filling taste becomes possible. Especially, supply of distinctive and characteristic low-calorie beer may be possible in each local beer industry.

What is claimed is:

1. A method of manufacturing fermented malt beverages, comprising the steps of:
    conducting a malting process;
    conducting a wort production process;
    adjusting the concentration of original extract of wort to 12 to 13 weight %;
    conducting a fermentation process; and
    conducting a layering process;
    wherein said step of conducting a wort production process comprises the steps of:
        adding α-glucosidase simultaneously with ground malt to brewing water to make a mash; and
        conducting a heat treatment on the mash to deactivate the α-glucosidase.

2. The method of manufacturing of claim 1, wherein no adjunct is added with the brewing water to make a mash in the wort production process.

3. The method of manufacturing of claim 1, wherein adjuncts are added to the malt in the mash.

4. Fermented malt beverages manufactured by the method of manufacturing of claim 1.

5. A method of manufacturing beers, comprising the steps of:
    conducting a malting process;
    conducting a wort production process;
    adjusting the concentration of original extract of wort to 13–30 weight %;
    conducting a fermentation process wherein α-glucosidase is added; and
    conducting a lagering process.

6. A method of manufacturing beers, comprising the steps of:
    conducting a malting process;
    conducting a wort production process;
    adjusting the concentration of original extract of wort to 13–30 weight %;
    conducting a fermentation process wherein α-glucosidase is added, such that the acetic acid concentration is less than in the process performed in the absence of α-glucosidase; and
    conducting a lagering process.

7. The method of manufacturing beers of claim 5, wherein a brewer's yeast or a yeast for brewing other than a brewer's yeast is added during the fermentation process.

8. The method of manufacturing beers of claim 7, wherein one or more selected from the group consisting of a sake yeast, a wine yeast, and a shochu yeast, is added during the fermentation process.

9. The method of manufacturing beers of claim 5, wherein the concentration of original extract of wort is 18–25 weight %.

10. The method of manufacturing beers of claim 5, wherein the amount of α-glucosidase used is 50–400 ppm per the malt amount.

11. A method of manufacturing low-calorie beers, comprising the steps of:
    conducting a malting process;
    conducting a wort production process;
    adjusting the concentration of original extract of wort to 12–30 weight %;
    conducting a fermentation process wherein α-glucosidase is added in the fermentation process, such that the real degree of fermentation is greater than in the process performed in the absence of α-glucosidase; and
    conducting a layering process.

12. The method of manufacturing low-calorie beers of claim 11, wherein a brewer's yeast or a yeast for brewing other than a brewer's yeast is added during the fermentation process.

13. The method of manufacturing low-calorie beers of claim 12, wherein one or more selected from the group consisting of a sake yeast, a wine yeast, and a shochu yeast is added during the fermentation process.

14. The method of manufacturing low-calorie beers of claim 11, wherein the concentration of original extract of wort is 13–30 weight %.

15. The method of manufacturing low-calorie beers of claim 11, wherein the amount of α-glucosidase used is 50–400 ppm per the malt amount.

* * * * *